US010967835B2

(12) United States Patent
Woo et al.

(10) Patent No.: US 10,967,835 B2
(45) Date of Patent: Apr. 6, 2021

(54) ELECTRONIC DEVICE AND METHOD FOR CONTROLLING ELECTRONIC DEVICE

(71) Applicant: SAMSUNG ELECTRONICS CO., LTD., Suwon-si (KR)

(72) Inventors: Jeong Woo, Yongin-si (KR); Minyong Song, Suwon-si (KR); Soyoung Lee, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 16/349,705

(22) PCT Filed: Oct. 27, 2017

(86) PCT No.: PCT/KR2017/012031
§ 371 (c)(1),
(2) Date: May 14, 2019

(87) PCT Pub. No.: WO2018/093060
PCT Pub. Date: May 24, 2018

(65) Prior Publication Data
US 2019/0366978 A1 Dec. 5, 2019

(30) Foreign Application Priority Data
Nov. 15, 2016 (KR) .................. 10-2016-0152133

(51) Int. Cl.
B60R 25/24 (2013.01)
G07C 9/00 (2020.01)
H04B 7/08 (2006.01)
H04W 12/06 (2009.01)

(52) U.S. Cl.
CPC ............ B60R 25/24 (2013.01); B60R 25/245 (2013.01); G07C 9/00309 (2013.01);
(Continued)

(58) Field of Classification Search
CPC ...... G09C 9/00309; G09C 2009/00341; G07C 2209/63
See application file for complete search history.

(56) References Cited

U.S. PATENT DOCUMENTS 8,768,539 B1    7/2014  Clement et al.
9,358,940 B2 *  6/2016  Cooper .................. E05F 15/77
(Continued)

FOREIGN PATENT DOCUMENTS

JP    2015-228613       12/2015
KR    10-2007-0049436   5/2007
(Continued)

OTHER PUBLICATIONS

International Search Report for PCT/KR2017/012031, dated Feb. 7, 2018, 4 pages.
(Continued)

Primary Examiner — Daniell L Negron
(74) Attorney, Agent, or Firm — Nixon & Vanderhye, P.C.

(57) ABSTRACT

The present invention relates to an electronic device and a method for controlling the electronic device, and the electronic device according to various embodiments of the present document comprises a processor, wherein the processor can: receive, via a communication circuit, at least one signal from an external electronic device having a smart key; perform verification with the external electronic device on the basis of the at least one signal; measure an angle at which the at least one signal has been received and/or a received signal strength indication (RSSI) thereof, on the basis of the result of the verification performed; identify the location of the external electronic device on the basis of the measured reception angle and/or RSSI of the at least one signal; and, based on the identified location of the external electronic
(Continued)

device, control at least some components of the electronic device.

13 Claims, 11 Drawing Sheets

(52) U.S. Cl.
CPC .......... *H04B 7/0857* (2013.01); *H04W 12/06* (2013.01); *H04W 12/0609* (2019.01); *B60R 2325/101* (2013.01); *B60R 2325/205* (2013.01); *G07C 2009/00341* (2013.01); *G07C 2209/63* (2013.01)

(56) References Cited

U.S. PATENT DOCUMENTS

| | | |
|---|---|---|
| 2009/0088073 A1 | 4/2009 | Rofougaran et al. |
| 2012/0109422 A1 | 5/2012 | Katou |
| 2015/0048927 A1 | 2/2015 | Simmons |
| 2015/0145646 A1 | 5/2015 | Seino |
| 2015/0148989 A1 | 5/2015 | Cooper et al. |
| 2016/0098136 A1 | 4/2016 | Lobo et al. |

FOREIGN PATENT DOCUMENTS

| | | |
|---|---|---|
| KR | 10-1058590 | 8/2011 |
| KR | 10-1409124 | 6/2014 |
| KR | 10-2016-0088879 | 7/2016 |

OTHER PUBLICATIONS

Written Opinion of the ISA for PCT/KR2017/012031, dated Feb. 7, 2018, 6 pages.

* cited by examiner

US 10,967,835 B2

ELECTRONIC DEVICE AND METHOD FOR CONTROLLING ELECTRONIC DEVICE

This application is the U.S. national phase of International Application No. PCT/KR2017/012031 filed 27 Oct. 2017, which designated the U.S. and claims priority to KR Patent Application No. 10-2016-0152133 filed 15 Nov. 2016, the entire contents of each of which are hereby incorporated by reference.

TECHNICAL FIELD

The present invention relates to an electronic device and a method for controlling the electronic device.

DESCRIPTION OF RELATED ART

With the growths of information and communication technologies and semiconductor technologies, mobile electronic devices such as smart phones have been popularized in these days. The user may use various services through various applications installed in the electronic device.

Recently, a method for controlling other electronic device by applying the technology of electronic devices have been researched and developed. For example, a smart key may be installed in an electronic device to control a door unit of a vehicle on the basis of the position of the electronic device.

An electronic device may communicate with an external electronic device having a smart key through short-range communication, e.g., Bluetooth communication and thereby identify the position of the external electronic device.

However, the Bluetooth communication frequently invites signal crosstalk due to the use of a high frequency band (e.g., 2.4 GHz), thus causing a problem such as signal failure or disconnection. Thus, when the electronic device recognizes the position of the external electronic device, the accuracy may be lowered. If the electronic device wrongly identifies the position of the external electronic device, an error may be caused in operations of controlling the electronic device.

SUMMARY

Various embodiments of the present invention provide an electronic device capable of increasing the reliability of operations of controlling the electronic device and a method for controlling the electronic device by improving the accuracy of identifying the position of an external electronic device having a smart key.

An electronic device according to various embodiments of this disclosure may comprise a processor configured to receive, via the communication circuit, at least one signal from an external electronic device having a smart key, to perform authentication with the external electronic device, based on the at least one signal, to measure at least one of a reception angle of the at least one signal or a received signal strength indication (RSSI) of the at least one signal, based on a result of the performed authentication, to identify a position of the external electronic device, based on at least one of the measured reception angle or the measured RSSI, and to control at least some components of the electronic device, based on the identified position of the external electronic device.

A method for controlling an electronic device according to various embodiments of this disclosure may comprise operations of receiving, via a communication circuit, at least one signal from an external electronic device having a smart key, performing authentication with the external electronic device, based on the at least one signal, measuring at least one of a reception angle of the at least one signal or a received signal strength indication (RSSI) of the at least one signal, based on a result of the performed authentication, identifying a position of the external electronic device, based on at least one of the measured reception angle or the measured RSSI, and controlling at least some components of the electronic device, based on the identified position of the external electronic device.

According to various embodiments of the present invention, an electronic device can improve the accuracy of identifying the position of an external electronic device having a smart key, thereby providing improved user convenience.

DETAILED DESCRIPTION OF EXAMPLE EMBODIMENTS

Figure 1:
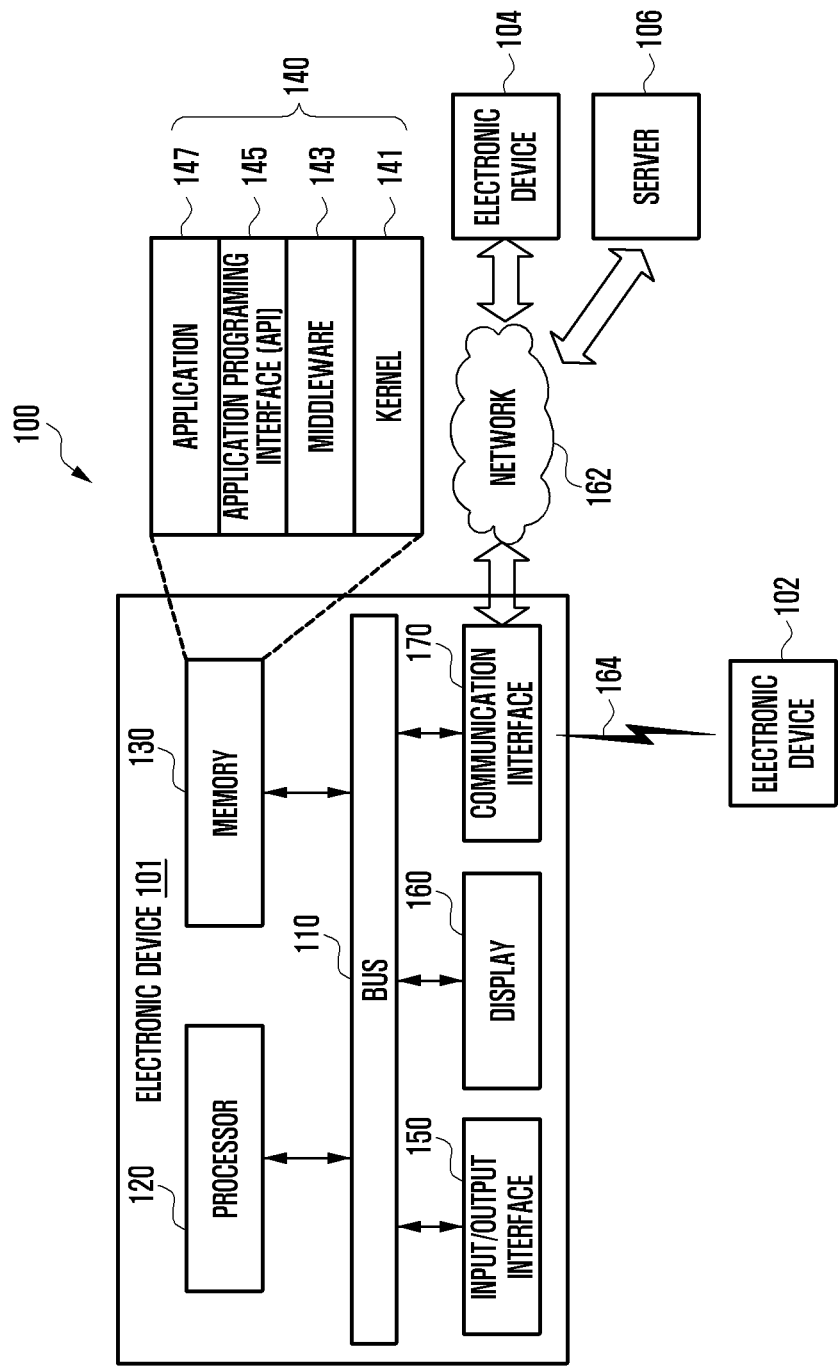
FIG. 1 is a diagram illustrating an electronic device within a network environment in various embodiments.

Hereinafter, various embodiments of the present disclosure will be described with reference to the accompanying drawings. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B" or "at least one of A and/or B" may include all possible combinations of the items enumerated together in a corresponding one of the phrases. In the present disclosure, expressions including ordinal numbers, such as "1st", "2nd", "first", "second," etc., are used merely for the purpose to distinguish an element from the other elements without limiting such elements regardless of the sequence and/or importance of the elements. When a certain element (e.g., first element) is referred to as being "connected" or "coupled" (operatively or communicatively) to another element (e.g., second element), it may mean that the first element is connected or coupled directly to the second element or indirectly through any other element (e.g., third element).

The expression "configured to" may be interchangeably used with any other expressions "suitable for", "having the ability to", "designed to", "adapted to", "made to", "being able to", and "capable of". The expression "device configured to" may mean that the device, together with other devices or components, "is able to". For example, the phrase "processor configured to perform A, B and C" may mean a dedicated processor (e.g., embedded processor) for performing corresponding operations or a generic-purpose processor (e.g., central processing unit (CPU) or application processor (AP)) capable of performing corresponding operations by executing one or more software programs stored in a memory.

An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a portable medical device, a digital camera, or a wearable device. According to various embodiments, the wearable device may include at least one of an accessory-type device (e.g., a watch, a ring, a bracelet, an anklet, a necklace, glasses, a contact lens, or a head-mounted device (HMD), a fabric- or cloth-type device (e.g., electronic cloth), a body-attached type device (e.g., a skin pad or tattoo), or a body-implemented type circuit. In some embodiments, the electronic device may be home appliance. For example, the home appliance may include at least one of a TV, a digital video disk (DVD) player, audio equipment, a refrigerator, an air conditioner, a vacuum cleaner, an oven, a microwave, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic picture frame.

In another embodiment, the electronic device may include at least one of a medical device (e.g., portable medical measuring equipment (e.g., a blood sugar meter, a heart rate meter, a blood pressure meter, a clinical thermometer, etc.), a magnetic resonance angiography (MRA), a magnetic resonance imaging (MRI), a computed tomography (CT), an ultrasonography, etc.), a navigation device, a global navigation satellite system (GNSS), an event data recorder (EDR), a flight data recorder (FDR), a car infotainment device, electronic equipment for ship (e.g., a marine navigation system, a gyrocompass, etc.), avionics, security equipment, a car head unit, an industrial or home robot, an automated teller machine (ATM), a point of sales (POS), or a device for internet of things (IoT) (e.g., a bulb, a sensor, a sprinkler, a fire alarm, a thermostat, a streetlight, a toaster, athletic equipment, a hot-water tank, a heater, a boiler, etc.). In a certain embodiment, the electronic device may be include at least one of furniture, a part of a building/construction or car, an electronic board, an electronic signature receiving device, a projector, or various measuring instruments (e.g., a water meter, an electric meter, a gas meter, a wave meter, etc.). In various embodiments, the electronic device may be one of the above-mentioned devices or a combination thereof. The electronic device according to a certain embodiment may be a flexible electronic device. The electronic device according to embodiments disclosed herein is not limited to the above-mentioned devices and may include new electronic devices to be launched with the growth of technology. Hereinafter, an electronic device according to various embodiments will be described. In this disclosure, the term user may refer to a person or a device (e.g., an artificial intelligence device) using the electronic device.

FIG. 1 shows an electronic device 101 in a network environment 100 according to various embodiments. The electronic device 100 may include a bus 110, a processor 120, a memory 130, an input/output (I/O) interface 150, a display 160, and a communication interface 170. In a certain embodiment, the electronic device 101 may omit at least one of the above elements or further include any other element. The bus 110 may be a circuit which interconnects the above elements 120 to 170 and delivers a communication (e.g., a control message and/or data) between the above elements. The processor 120 may include at least one of a central processing unit (CPU), an application processor (AP), or a communication processor (CP). The processor 120 may execute an operation or data processing for control and/or communication of at least one of other elements.

The memory 130 may include volatile and/or non-volatile memory. The memory 130 may store instructions or data related to at least one element of the electronic device 101. According to an embodiment, the memory 130 may store software and/or programs 140. The programs 140 may include, for example, a kernel 141, a middleware 143, an application programming interface (API) 145, and/or an application program (or application) 147. At least some of the kernel 141, the middleware 143, and the API 145 may be referred to as an operating system (OS). The kernel 141 may control or manage system resources (e.g., the bus 110, the processor 120, the memory 130, etc.) used to execute operations or functions implemented in other programs (e.g., the middleware 143, the API 145, and the application program 147). Also, the kernel 141 may provide an interface capable of accessing individual elements of the electronic device 101 through the middleware 143, the API 145, or the application program 147, and thereby controlling or managing system resources.

The middleware 143 may perform a function of an intermediary so that the API 145 or the application program 147 communicates with the kernel 143 and thereby exchanges data. In addition, the middleware 143 may process one or more work requests, received from the application program 147, according to priorities. For example, the middleware 143 may assign, to the application program 147, a priority for using system resources (e.g., the bus 110, the processor 120, the memory 130, etc.) of the electronic device 101 and then process the one or more work requests. The API 145 is an interface through which the application 147 controls a function provided by the kernel 141 or the middleware 143, and may include, for example, at least one interface or function (e.g., instructions) for file control, window control, image processing, character control, and/or the like. The I/O interface 150 may transmit commands or data, inputted from a user or other external device, to other element(s) of the electronic device 101, or output commands or data, received from other element(s) of the electronic device 101, to a user or other external device.

The display 160 may include, for example, a liquid crystal display (LCD), a light-emitting diode (LED) display, an organic light-emitting diode (OLED) display, a micro-electro-mechanical systems (MEMS) display, or an electronic paper display. The display 160 may display, for example, various contents (e.g., text, image, video, icon, symbol, etc.) to a user. The display 160 may include a touch screen and may receive, for example, a touch, gesture, proximity, or hovering input using an electronic pen or a portion of the user's body. The communication interface 170 may establish communication between the electronic device 101 and an external device (e.g., a first external electronic device 102, a second external electronic device 104, or a server 106). For example, the communication interface 170 may be connected to the network 162 via wireless or wired communication and communicate with an external device (e.g., the second external electronic device 104 or the server 106).

The wireless communication may include cellular communication using at least one of, for example, LTE, LTE Advance (LTE-A), code division multiple access (CDMA), wideband CDMA (WCDMA), universal mobile telecommunications system (UNITS), wireless broadband (WiBro), global system for mobile communications (GSM), and the like. According to an embodiment, the wireless communication may include at least one of, for example, wireless fidelity (WiFi), Bluetooth, Bluetooth low power (BLE), Zigbee, near field communication (NFC), magnetic secure transmission, radio frequency (RF), or body area network (BAN). According to an embodiment, the wireless communication may include GNSS. The GNSS may be, for example, global positioning system (GPS), global navigation satellite system (Glonass), Beidou navigation satellite system (Beidou), or Galileo, the European global satellite-based navigation system. Hereinafter, in this disclosure, "GPS" may be used interchangeably with "GNSS". The wired communications may include at least one of, for example, a universal serial bus (USB), a high definition multimedia interface (HDMI), a recommended standard 232 (RS-232), a power line communication, or a plain old telephone service (POTS). The network 162 may include a telecommunications network, for example, at least one of a computer network (e.g., LAN or WAN), the Internet, or a telephone network.

Each of the first and second external electronic devices 102 and 104 may be similar to or different from the electronic device 101 in types. According to various embodiments, all or part of operations performed in the electronic device 101 may be performed in another electronic device or multiple electronic devices (e.g., the electronic devices 102 and 104 and the server 106). According to an embodiment, in case of having to perform a certain function or service automatically or on demand, the electronic device 101 may request any other electronic device (e.g., the electronic device 102 or 104 or the server 106) to perform at least part of the function or service rather than or in addition to autonomously performing the function or service. Then, the other electronic device (e.g., the electronic device 102 or 104 or the server 106) may perform the requested function or service and return a result to the electronic device 101. The electronic device 101 may provide the requested function or service by using or further processing the received result. For this, cloud computing technique, distributed computing technique, or client-server computing technique may be utilized for example.

Figure 2:
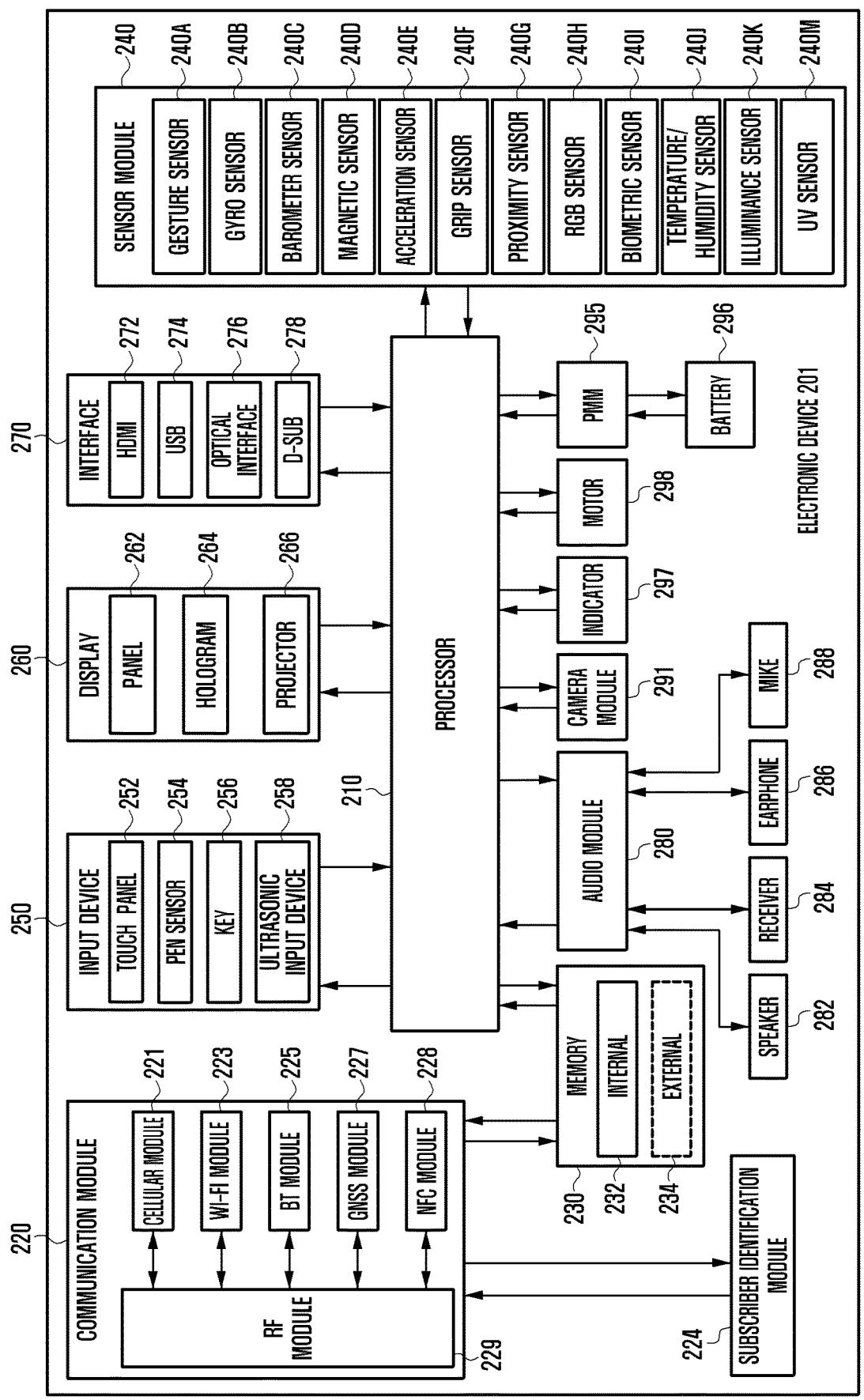
FIG. 2 is a block diagram illustrating an electronic device according to various embodiments.

FIG. 2 is a block diagram illustrating an electronic device 201 according to embodiments. The electronic device 201 may include, for example, the whole or part of the electronic device 101 shown in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298. The processor 210 may execute an operating system (OS) or an application program, control multiple hardware or software components connected to the processor 210, and perform processing and operations on various data. The processor 210 may be implemented by, for example, a system on chip (SoC). According to an embodiment, the processor 210 may further include a graphic processing unit (GPU) and/or an image signal processor. The processor 210 may include at least some of elements shown in FIG. 2 (e.g., a cellular module 221). The processor 210 may load and process instructions or data received from at least one of the other elements (e.g., non-volatile memory) into volatile memory and then store the resulting data in non-volatile memory.

The communication module 220 may be, for example, the communication module 170 shown in FIG. 1. The communication module 220 may include, for example, a cellular module 221, a Wi-Fi module 223, a Bluetooth (BT) module 225, a GNSS module 227, an NFC module 228, and a radio frequency (RF) module 229. The cellular module 221 may provide a voice call, a video call, a messaging service, or an Internet service, for example, through a communication network. According to an embodiment, the cellular module 221 may utilize the subscriber identity module (e.g., a SIM card) 224 to perform the identification and authentication of the electronic device 201 in the communication network. According to an embodiment, the cellular module 221 may perform at least some of functions that the processor 210 may provide. According to an embodiment, the cellular module 221 may include a communications processor (CP). Each of the WiFi module 223, the Bluetooth module 225, the GNSS module 227, and the NFC module 228 may include a processor for processing data transmitted or received therethrough. According to a certain embodiment, at least some (e.g., two or more) of the cellular module 221, the WiFi module 223, the Bluetooth module 225, the GNSS module 227, or the NFC module 228 may be included in an integrated chip (IC) or an IC package. The RF module 229 may, for example, transmit and receive communication signals (e.g., RF signals). The RF module 229 may include, for example, a transceiver, a power amplifier module (PAM), a frequency filter, a low noise amplifier (LNA), or an antenna. According to another embodiment, at least one of the cellular module 221, the WiFi module 223, the Bluetooth module 225, the GNSS module 227, or the NFC module 228 may transmit and receive RF signals through separate RF modules. The SIM 224 may include, for example, a card having SIM or an embedded SIM, and may include unique identification information (e.g., an integrated circuit card identifier (ICCID), or an international mobile subscriber identity (IMSI)).

The memory 230 (e.g., the memory 130 shown in FIG. 1) may include an internal memory 232 and an external memory 234. The internal memory 232 may include, for example, at least one of a volatile memory (e.g., a DRAM, an SRAM, or SDRAM), and a non-volatile memory (e.g., a one time programmable ROM (OTPROM), a PROM, an EPROM, an EEPROM, a mask ROM, a flash ROM, a flash memory, a hard drive, or a solid state drive (SSD)). The external memory 234 may include a flash drive, for example, a compact flash (CF), a secure digital (SD), a micro-SD, a mini-SD, an extreme Digital (xD), or a memory stick. The external memory 234 may be functionally or physically connected to the electronic device 201 through various interfaces.

The sensor module 240 may, for example, measure a physical quantity or detect an operating state of the electronic device 201 and convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green and blue) sensor), a biometric sensor 240I, a temperature/humidity sensor 240J, an illuminance sensor 240K, or a ultra violet (UV) sensor 240M. Additionally or alternatively, the sensor module 240 may include, for example, an electromyography (EMG) sensor, an electroencephalogram (EEG) sensor, an electroardiogram (ECG) sensor, an infrared (IR) sensor, an iris sensor, and/or a fingerprint sensor. The sensor module 240 may further include a control circuit for controlling one or more sensors included therein. In a certain embodiment, the electronic device 201 further includes a processor configured to control the sensor module 240, either as part of the processor 210 or separately, to control the sensor module 240 while the processor 210 is in a sleep state.

The input device 250 may include various input circuitry, such as, for example, and without limitation, a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user. The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 through an input tool that generates ultrasonic signals, thus allowing wireless recognition.

The display 260 (e.g., the display 160) may include a panel 262, a hologram 264, a projector 266, and/or a control circuit for controlling them. The panel 262 may have a flexible, transparent or wearable form. The panel 262 may be formed of a single module with the touch panel 252. In a certain embodiment, the panel 262 may include a pressure sensor (or a force sensor which will be interchangeably used hereinafter) capable of measuring a pressure of a user's touch. The pressure sensor may be incorporated into the touch panel 252 or formed separately from the touch panel 252. The hologram 264 may show a stereoscopic image in the air using interference of light. The projector 266 may project an image onto a screen, which may be located at the inside or outside of the electronic device 201. The interface 270 may include various interface circuitry, such as, for example, and without limitation, an HDMI (High-Definition Multimedia Interface) 272, a USB (Universal Serial Bus) 274, an optical interface 276, or a D-sub (D-subminiature) 278. The interface 270 may be contained, for example, in the communication interface 170 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least parts of the audio module 280 may be included, for example, in the I/O interface 145 shown in FIG. 1. The audio module 280 may process sound information inputted or outputted through a speaker 282, a receiver 284, an earphone 286, or a microphone 288. The camera module 291 is a device capable of acquiring still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown). The image sensor may include an integrated circuit photoelectric conversion device using a manufacturing technique of a semiconductor device. The power management module 295 may manage electric power of the electronic device 201. Although not shown, the power management module 295 may include, for example, a PMIC (Power Management Integrated Circuit), a charger IC, or a battery or fuel gauge. The PMIC may have wired and/or wireless charging types. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 296 and a voltage, current or temperature in a charging process. The battery 296 may store or create electric power therein and supply electric power to the electronic device 201. The battery 296 may be, for example, a rechargeable battery or a solar battery.

The indicator 297 may show thereon a current status (e.g., a booting status, a message status, or a recharging status) of the electronic device 201 or of its part (e.g., the AP 210). The motor 298 may convert an electric signal into a mechanical vibration. Although not shown, the electronic device 201 may include a specific processor (e.g., GPU) for supporting a mobile TV. This processor may process media data that comply with standards of DMB (Digital Multimedia Broadcasting), DVB (Digital Video Broadcasting), or Media-Flo™. Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
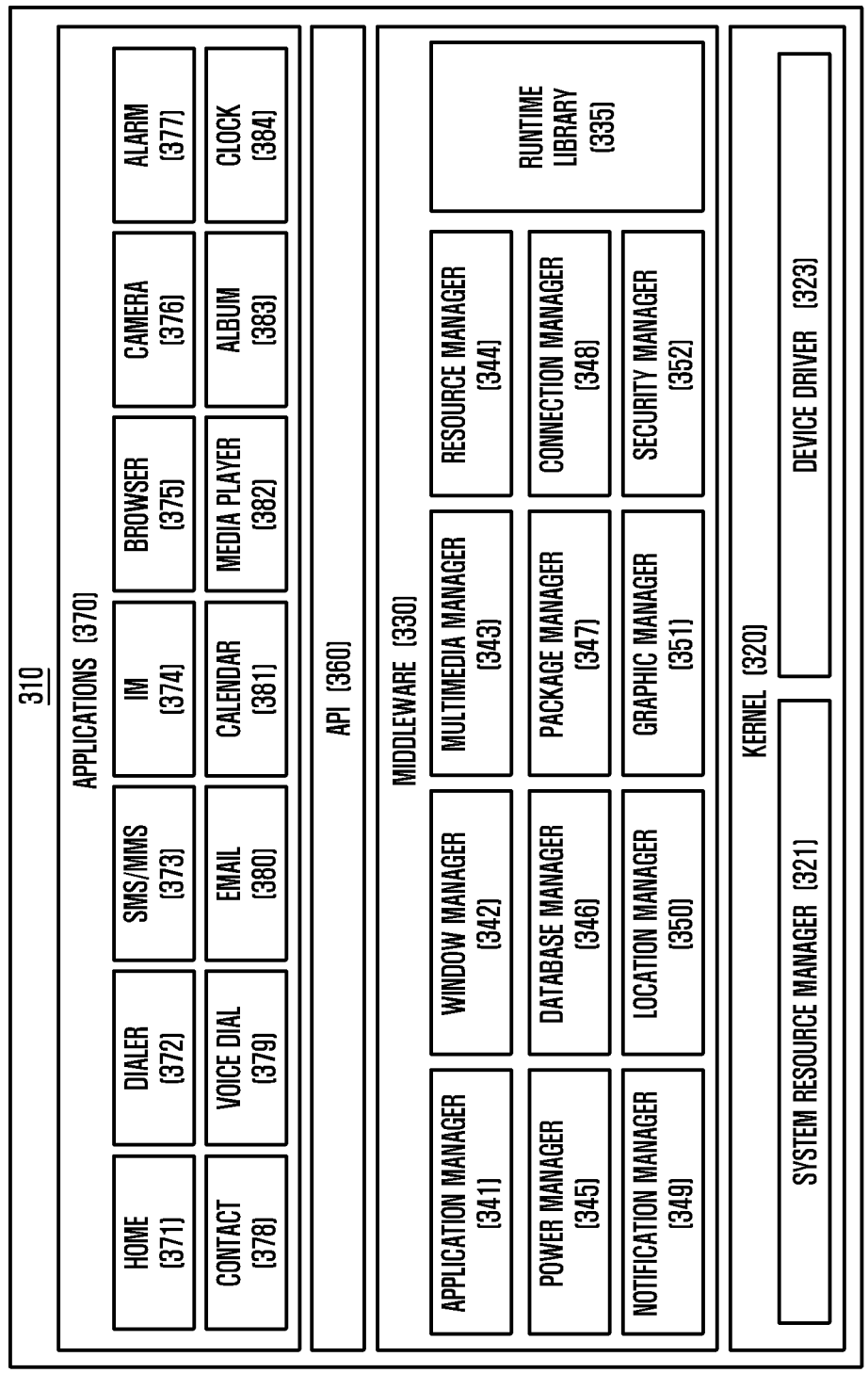
FIG. 3 is a block diagram illustrating a program module according to various embodiments.

FIG. 3 is a block diagram illustrating a program module according to various embodiments. According to one embodiment, the program module 310 (e.g., the program 140) may include an OS controlling resources related to an electronic device (e.g., the electronic device 101) and/or various applications (e.g., the application program 147) executed in the OS. For example, the OS may be Android, iOS™, Windows, Symbian™, Tizen™, Bada™, and the like. The program module 310 may include a kernel 320 (e.g., the kernel 141), a middleware 330 (e.g., the middleware 143), an API 360 (e.g., the API 145), and/or the application 370 (e.g., the application program 147). At least a part of the program module 310 may be preloaded in the electronic device or downloaded from an external electronic device (e.g., the electronic device 102, 104 or the server 106).

The kernel 320 may include a system resource manager 321 and/or a device driver 323. The system resource manager 321 may perform the control, allocation, recovery, and/or the like of system resources. According to one embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like. The application manager 341 may manage, for example, a life cycle of at least one of the applications 370. The window manager 342 may manage GUI resources used on the screen. For example, when at least two displays 260 are connected, the screen may be differently configured or managed in response to the ratio of the screen or the action of the application 370. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370. The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment, when the electronic device (e.g., the electronic device 101) has a telephone function, the middleware 330 may further include a telephony manager for managing a voice telephony call function and/or a video telephony call function of the electronic device. The middleware 330 may include a middleware module for forming various functional combinations of the above-described elements. The middleware 330 may provide modules specialized according to types of OSs in order to provide differentiated functions. Also, the middleware 330 may dynamically delete some of the existing elements, or may add new elements. The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, or at least one application capable of performing functions such as health care (e.g., measurement of exercise amount or blood glucose) or environmental information provision (e.g., providing information about air pressure, humidity, temperature, or the like). According to one embodiment, the applications 370 may include an application (hereinafter, referred to as "information exchange application") that supports the exchange of information between the electronic device and an external electronic device. The information exchange application may include, for example, a notification relay application for delivering specific information to the external electronic device, or a device management application for managing the external electronic device. For example, the notification relay application may have a function of sending notification information generated in other applications (e.g., the SMS/MMS application, the email application, the healthcare application, or the environmental information application) of the electronic device to the external electronic device. Further, the notification relay application may receive notification information from the external electronic device and provide it to the user. The device management application may manage (e.g., install, delete, or update) at least one function (e.g., turn-on/turn-off of the external electronic device itself or some components thereof or adjusting the brightness or resolution of the display) of the external electronic device, at least one application running in the external electronic device, or at least one service (e.g., a call service or a message service) provided in the external electronic device. According to one embodiment, the applications 370 may include an application (e.g., a healthcare application of a mobile medical device, etc.) designated depending on the attributes of the external electronic device. According to one embodiment, the applications 370 may include an application received from the external electronic device. According to one embodiment, the applications 370 may include a preloaded application or a third party application downloadable from a server. The names of elements of the program module 310 according to the illustrated embodiment may be varied depending on the type of the operating system. According to various embodiments, at least a part of the program module 310 may be implemented in software, firmware, hardware, or a combination thereof.

At least a part of the program module 310 may be implemented (e.g., executed) by, for example, a processor (e.g., 210). At least a part of the program module 310 may include, for example, modules, programs, routines, sets of instructions, or processes to perform one or more functions.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions. According to various embodiments, at least a part of the device (e.g., modules or functions thereof) or the method (e.g., operations) may be implemented as instructions stored in a non-transitory computer-readable storage medium (e.g., the memory 130) in a programming module form. When the instructions are executed by a processor (e.g., 120), the processor may perform a function corresponding to the instructions. The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

In various embodiments of the present invention, the electronic device may be a part of a house or building to which the information and communication technology is applied. For example, the electronic device may be a part of a building to which a smart home system is applied. The electronic device may be configured to control, based on the position of an external electronic device including a smart key, at least some of components of the building to which the smart home system is applied, for example, at least some doors of the building, at least some electrical equipment of the building, at least some ventilation facilities, at least some air conditioning equipment of the building, or the like. According to another embodiment, the electronic device may be a part of means of transport such as a car, a motorcycle, an aircraft, or a drone. The electronic device may have any form as long as it can move a person or thing. The electronic device may control, based on the position of an external electronic device including a smart key, at least some of components of means of transport such as a door, a starter, an air conditioner, a seat, an audio player, a display, or a headlight of the means of transport.

Although the electronic device is described hereinafter as a part of a car which is means of transport, the electronic device of the present invention may be at least a part of a system including a smart key.

Figure 4:
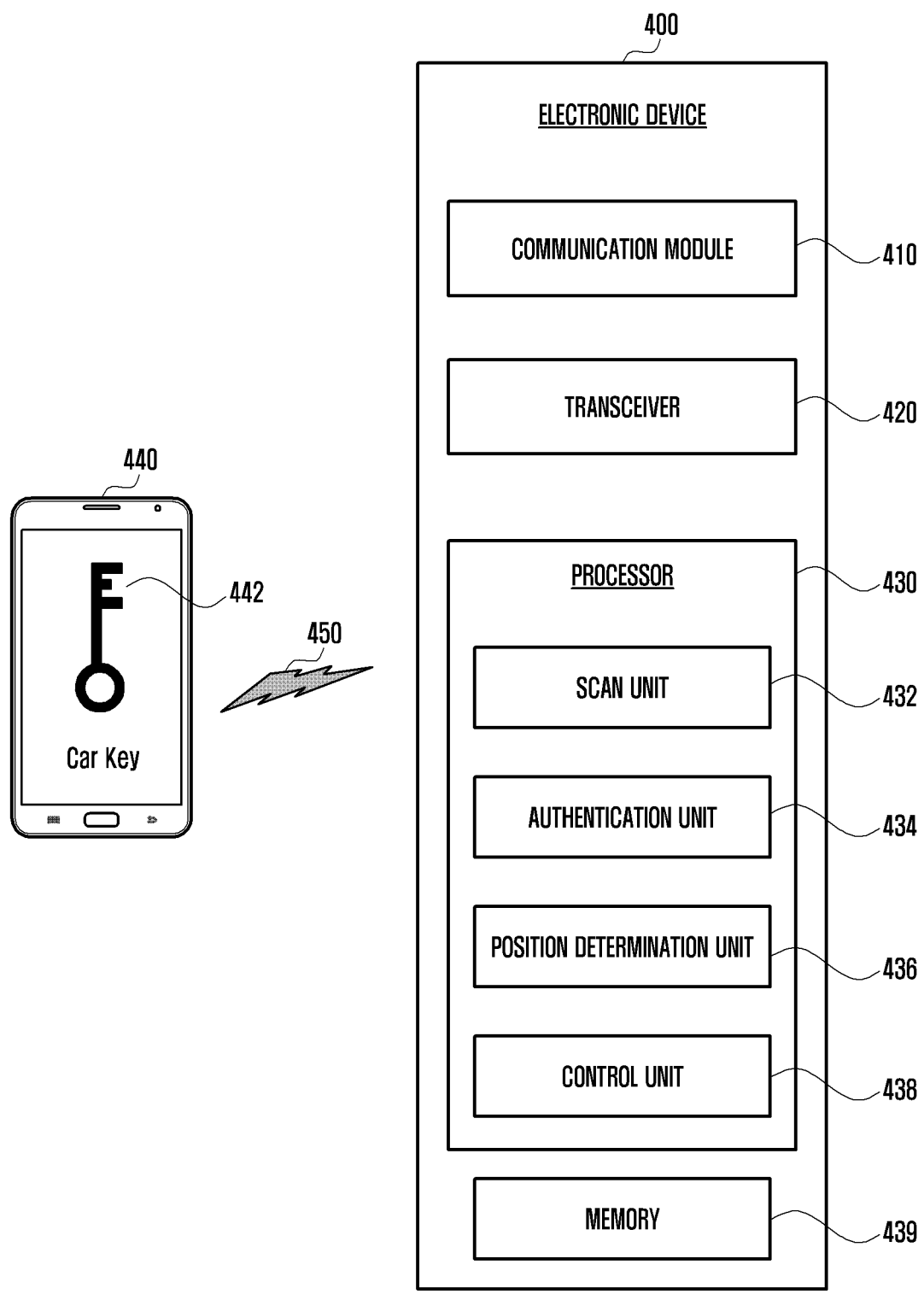
FIG. 4 is a block diagram illustrating a control system according to various embodiments of the present invention.

FIG. 4 is a block diagram illustrating a control system (e.g., a vehicle control system) according to various embodiments of the present invention.

Referring to FIG. 4, the control system according to various embodiments of the present invention may include an electronic device 400 and an external electronic device 440.

According to various embodiments, the electronic device 400 may be means of transport or at least a part thereof. For example, the electronic device 400 may be a car or a part thereof. The electronic device 400 may control at least some components and functions of the means of transport. According to various embodiments, the means of transport may be a car, a motorcycle, an aircraft, or a drone, and may have any form as long as it can move a person or thing. Although the means of transport is described hereinafter as a car, the means of transport of the present invention may not be limited to the car.

According to various embodiments, the external electronic device 440 may have an application (e.g., a smart key 442) installed for controlling the electronic device 400 (e.g., a car). The external electronic device 440 may be connected to the electronic device 400 by using a short-range communication 450, e.g., Bluetooth communication. According to various embodiments, the short-range communication 450 that connects the external electronic device 440 and the electronic device 400 may be Wi-Fi, ZigBee, etc. in addition to Bluetooth, and any other short-range communication technique may be applied. The electronic device 400 and the external electronic device 440 may be the same as or similar to the electronic device 101 of FIG. 1.

According to an embodiment, the external electronic device 440 may be connected to the electronic device 400 and have an application installed for controlling the electronic device 400. In the application, the smart key 442 of the electronic device 400 may be registered. The external electronic device 440 may be connected to the electronic device 400 by driving the application and control components of the connected electronic device 400. The external electronic device 440 may provide a user interface for controlling the components of the electronic device 400 by driving the application.

According to various embodiments, the electronic device 400 may include a communication module 410, a transceiver 420, a processor 430, or a memory 439.

According to an embodiment, the communication module 410 may have the same or similar configuration as or to that of the communication interface 170 shown in FIG. 1. For example, the communication module 410 may include at least some (e.g., two or more) of a cellular module, a WiFi module, a Bluetooth module, a GNSS module, or an NFC module in one integrated chip (IC) or IC package.

The transceiver 420 may include at least one antenna connected to the communication module 410. For example, the transceiver 420 may be an antenna connected to a cellular module, a WiFi module, a Bluetooth module, a GNSS module, or an NFC module each of which is disposed in the communication module 410. According to an embodiment, the transceiver 420 may be connected to each or at least some (e.g., two or more) of the cellular module, the WiFi module, the Bluetooth module, the GNSS module, and the NFC module which are arranged in the communication module 410. Therefore, the cellular module, the WiFi module, the Bluetooth module, the GNSS module, or the NFC module disposed in the communication module 410 may transmit and receive RF signals through the transceiver 420.

Figure 5:
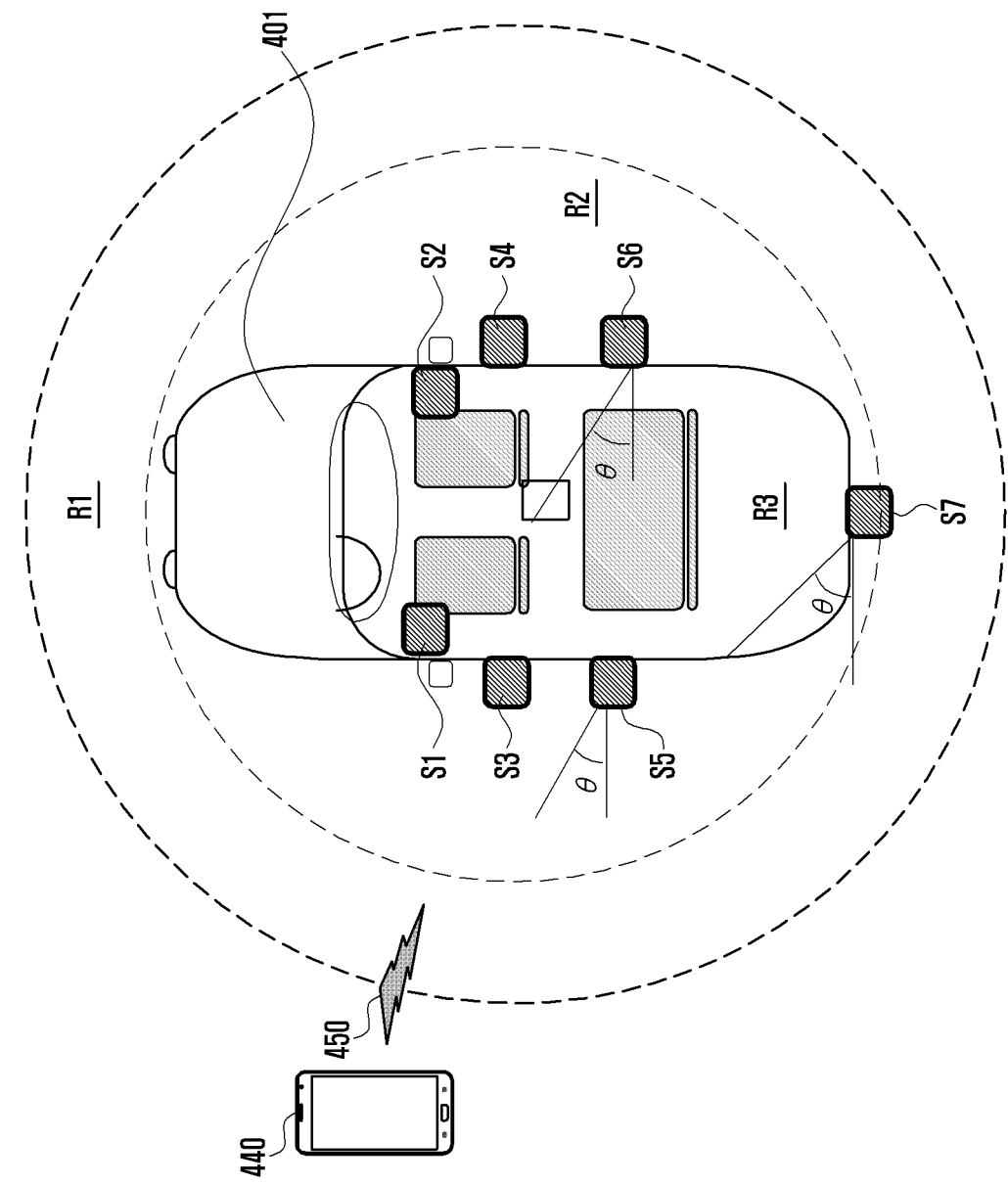
FIG. 5 is an exemplary view of a control system according to an embodiment.

According to an embodiment, the transceiver 420 may be disposed outside and inside the electronic device 400 (e.g., a car 401 in FIG. 5). For example, the transceiver 420 may include at least one external transceiver disposed outside the car 401 or at least one internal transceiver disposed inside the car 401. According to a certain embodiment, the external transceiver may be disposed at a door handle, a front or rear edge, a side mirror, a headlight, or a taillight. According to a certain embodiment, the internal transceiver may be disposed at an inner side of a door, a foot room, or the like.

According to an embodiment, the processor 430 may include a scan unit 432, an authentication unit 434, a position determination unit 436, or a control unit 438.

According to an embodiment, the scan unit 432 may periodically scan a call signal outputted from the external electronic device 440. The scan unit 432 may verify whether the received call signal is transmitted from the registered external electronic device 440.

According to an embodiment, the authentication unit 434 may perform an authentication procedure of the external electronic device 440 when the call signal is received from the registered external electronic device 440. For example, the authentication unit 434 may transmit a signal of requesting an authentication key to the external electronic device 440. Then, the external electronic device 440 may transmit an encrypted authentication key in response to the signal of requesting the authentication key. Upon receiving the encrypted authentication key, the authentication unit 434 may perform authentication by analyzing the received authentication key.

According to an embodiment, the position determination unit 436 may identify the position of the authenticated external electronic device 440. For example, the position determination unit 436 may transmit a signal to the external electronic device 440 to notify the completion of authentication and the start of positioning. According to a certain embodiment, the position determination unit 436 may transmit a request signal when authentication of the external electronic device 440 is completed. The request signal may be a signal of requesting the authenticated external electronic device 440 to transmit a position notification signal to be used for position identification. The external electronic device 440 may transmit the position notification signal in response to the request signal. According to an embodiment, the position determination unit 436 may receive the position notification signal and identify a current position of the external device 440 by analyzing the received position notification signal.

According to an embodiment, the position determination unit 436 may measure, as a first variable, an angle at which the position notification signal is received through the at least one transceiver 420. In addition, the position determination unit 436 may measure, as a second variable, a received signal strength indication (RSSI) of the position notification signal through the at least one transceiver 420. Then, the position determination unit 436 may identify the position of the external electronic device 440 by analyzing the measured first or second variable. For example, the position of the external electronic device 440 may include information about how far the external electronic device 440 is spaced from the electronic device 400 (e.g., a car) or about whether the external electronic device 440 is located inside the electronic device 400 (e.g., a car). That is, by analyzing the first variable or the second variable, the position determination unit 436 may identify a region where the external electronic device 440 is located, identify a distance between the external electronic device 440 and the electronic device 400 (e.g., a car), or identify whether the external electronic device 440 is located inside the electronic device 400 (e.g., a car).

According to various embodiments of the present invention, the electronic device 400 may analyze the reception angle or received signal strength indication (RSSI) of the position notification signal from the external electronic device 440 through the plurality of transceivers 420, thereby accurately identifying a region where the external electronic device 440 is located, and whether the external electronic device 440 is inside the electronic device 400. According to various embodiments, it is possible to prevent errors in operations of controlling the electronic device 400 based on the identified position of the external electronic device 440, thereby improving reliability and enhancing user convenience.

According to an embodiment, the control unit 438 may provide various services of controlling the electronic device 400, based on the identified position of the external electronic device 440. These services may include an intelligent function provided by the electronic device 400 on the basis of interaction with the external electronic device 440.

According to an embodiment, the control unit 438 controls the intelligent function interacting with the external electronic device 440, based on a result of sensing the approach or departure of the external electronic device 440 having a smart key 442. The intelligent function may include, for example, a function of opening or closing a door of a car without requiring a driver carrying the external electronic device 440 to take out the external electronic device 440 from his/her pocket, a function of turning on or off an engine of the car without requiring the driver to insert a physical key into the car, a function of turning on a headlight of the car when the driver approaches the car, a function of changing the state of a seat, a display, and/or audio player of the car based on information set by the driver in the external electronic device 440 when the driver approaches the car, a function of maintaining the state of the headlight for a certain time when the driver departs from the car by a certain distance, or a function of transmitting position information of the car to the external electronic device 440 when the driver departs from the car by a certain distance.

According to an embodiment, the memory 439 may include volatile and/or nonvolatile memory 439. For example, the memory 439 may store instructions or data related to at least one component of the electronic device 400. According to an embodiment, the memory 439 may store software (e.g., a car control application) and/or a program. The software may be an application that controls at least some components of the electronic device 400 while interacting with the external electronic device 440. The components of the electronic device 400 may include, for example, a door, trunk, engine, headlight, taillight, display, speaker, or seat of a car.

According to an embodiment, the memory 439 may include a mapping table (e.g., a lookup table) for the electronic device 400 to determine the position of the external electronic device 440. The mapping table may include a table that defines relations between the position (or region) of the external electronic device 440 and the angle at which a position notification signal is received from the external electronic device 440 via the at least one transceiver 420. Also, the mapping table may include a table that defines relations between the position (or region) of the external electronic device 440 and the received signal strength indication (RSSI) of the position notification signal received via the at least one transceiver 420. And also, the mapping table may include a table that defines relations among the position (or region) of the external electronic device 440, the reception angle of the position notification signal, and the received signal strength indication (RSSI) of the position notification signal.

The electronic device according to various embodiments of this disclosure comprises a processor configured to receive, via the communication circuit, at least one signal from an external electronic device having a smart key, to perform authentication with the external electronic device, based on the at least one signal, to measure at least one of a reception angle of the at least one signal or a received signal strength indication (RSSI) of the at least one signal, based on a result of the performed authentication, to identify a position of the external electronic device, based on at least one of the measured reception angle or the measured RSSI, and to control at least some components of the electronic device, based on the identified position of the external electronic device.

According to various embodiments of the invention, the communication circuit may include a first transceiver and a second transceiver, and the processor may be further configured to determine a distance between the external electronic device and the electronic device and/or a relative coordinate of the external electronic device, based on reception angles of a plurality of signals measured via the first and second transceivers. The first and second transceivers may be arranged in parallel with each other.

According to various embodiments of the invention, the processor may be further configured to analyze a difference in the RSSI between signals measured at the first and second transceivers, and to determine the position of the external electronic device, based on the analyzed result. For example, the processor may be further configured to define the RSSI of the at least one signal measured at the first transceiver as a first measured value, to define the RSSI of the at least one signal measured at the second transceiver as a second measured value, to, when the first measured value is greater than the second measured value, and when a difference between the first and second measured values is greater than a predetermined reference value, determine that the external electronic device is located at a first place based on the electronic device, and to, when the second measured value is greater than the first measured value, and when the difference between the first and second measured values is greater than the reference value, determine that the external electronic device is located at a second place based on the electronic device. Also, the processor may be further configured to determine, among a plurality of regions defined based on the electronic device, a region where the external electronic device is located, based on the reception angle of the signal measured via each of the first and second transceiver. For example, the plurality of defined regions may include an outer region of the electronic device including at least one of a right region, a left region, and a rear region, and an inner region of the electronic device. In addition, the processor may be further configured to periodically transmit a request signal for requesting transmission of the at least one signal, based on the authentication result, to periodically identify and update the position of the external electronic device, and to vary a transmission period of the request signal, based on the updated position of the external electronic device. Also, the processor may be further configured to determine, among a plurality of regions defined based on the electronic device, a region where the external electronic device is located, and to vary the transmission period of the request signal, based on the determined region. And also, the processor may be further configured to reduce the transmission period of the request signal as the identified position of the external electronic device is closer to the electronic device.

FIG. 5 is an exemplary view of a control system according to an embodiment.

Referring to FIG. 5, the electronic device 400 may include at least one transceiver 420 disposed outside the electronic device 400 and at least one transceiver 420 disposed within the electronic device 400. For example, some transceivers S3 and S5 may be disposed at left doors of a car 401, and also some transceivers S4 and S6 may be disposed at right doors of the car 401. In addition, a certain transceiver S7 may be disposed near a taillight or bumper of the car, and also some transceivers S1 and S2 may be disposed at an inner side of the door of the car 401. Besides, another transceiver may be disposed in the foot room of the car 401.

According to an embodiment, the position determination unit 436 of the processor 430 may set at least one region based on the position of the electronic device 400 on the basis of the position of the transceiver 420. The position determination unit 436 may define the at least one region by referring to the memory 439. The at least one region may be defined based on the reception angle or RSSI of the position notification signal measured through the at least one transceiver 420. For example, the position determination unit 436 may define, as a first region R1, an outer region within a first distance from the car 401. In addition, the position determination unit 436 may define, as a second region R2, a region outside the first region R1 within a second distance from the car 401. The second distance may be greater than the first distance. Also, the position determination unit 436 may define the inner area of the car 401 as a third region R3.

According to an embodiment, when the position determination unit 436 identifies the position of the external electronic device 440, the control unit 438 of the processor 430 may control at least one component of the electronic device 400, based on the identified result. For example, based on which of the first to third regions R1 to R3 the external electronic device 440 is located, the control unit 438 may control the components of the car 401. For example, when the external electronic device 440 moves from one region to another, the control unit 438 may control the components of the car 401. For example, when the external electronic device 440 moves from the second region R2 to the first region R1 or moves from the first region R1 to the third region R3, the control unit 438 may control the components of the car 401.

A method of the control unit 438 for controlling the components of the car 401 based on the position of the external electronic device 440 may be, for example, as shown in Table 1 below.

TABLE 1

| Region | Car Operation | Electronic Device Operation |
|---|---|---|
| Entry into 1st region | Welcome Lighting on | Key App Standby for Quick Execution (Key App is executed as soon as the screen is touched in the lock state) |

TABLE 1-continued

| Region | Car Operation | Electronic Device Operation |
|---|---|---|
| From 1st region to 2nd region | Car Door Open Standby & Car Seat Adjust | |
| From 2nd region to 3rd region | Engine on Standby | Multimedia Connection (Navigation, BT, Mirror Link) |
| From 3rd region to 2nd region | Warning in case of Engine on-state | Multimedia Disconnection |
| From 2nd region to 1st region | Door Auto Close | Parking Location Save |
| Departure from 1st region | Welcome Lighting on | Release Standby for Key App Quick Execution |

Figure 6:
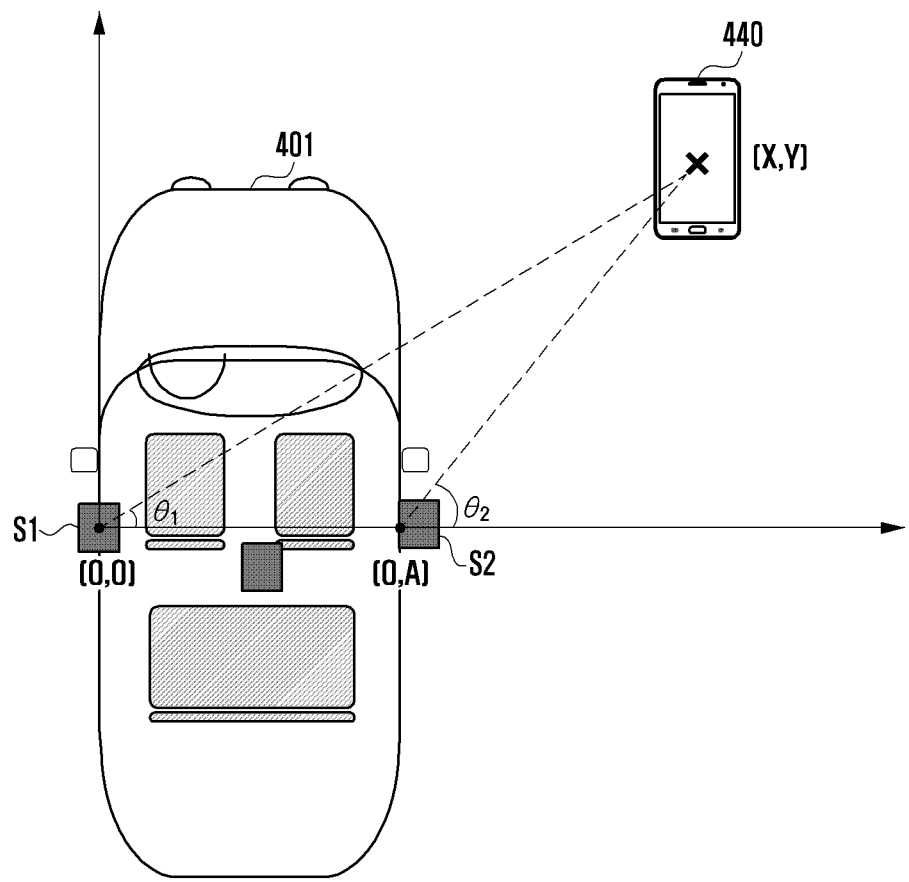
FIG. 6 is a schematic view showing a method for an electronic device to identify the position of an external electronic device according to an embodiment.

FIG. 6 is a schematic view showing a method for an electronic device to identify the position of an external electronic device according to an embodiment.

Referring to FIG. 6, the position determination unit 436 of the processor 430 may analyze the angle at which the position notification signal is received through the plurality of transceivers, and thereby calculate a distance of the external electronic device 440 from the electronic device 400 and/or the coordinates of the external electronic device 440.

According to an embodiment, when identifying the position of the external electronic device 440, the position determination unit 436 may define the coordinates of the first and second transceivers as (0, 0) and (0, A), respectively, and also define the coordinates of the external electronic device 440 as (X, Y). According to an embodiment, the position determination unit 436 may calculate the coordinates (X, Y) of the external electronic device 440 according to Equation 1. For example, the position of the external electronic device 440 may be calculated using an angle of arrival (AOA) technique. As shown in FIG. 6, the first and second transceivers may be a pair of transceivers S1 and S2 arranged in parallel with each other among the plurality of transceivers $$X = \frac{A \tan \theta_2}{\tan \theta_2 - \tan \theta_1},$$ [Equation 1]

$$Y = \frac{A \tan \theta_1 \tan \theta_2}{\tan \theta_2 - \tan \theta_1} \quad \tan \theta_1 = \frac{Y}{X} \tan \theta_2 = \frac{Y}{X - A}$$

$\theta_1$: An angle at which the position notification signal is received via the first transceiver S1

$\theta_2$: An angle at which the position notification signal is received via the second transceiver S2

According to an embodiment, the position determination unit 436 of the processor 430 may analyze a difference in the RSSI between the position notification signals measured at a pair of transceivers and thereby determine whether the external electronic device 440 is located inside the electronic device 400.

According to an embodiment, the position determination unit 436 may define the RSSI of the position notification signal measured at the first transceiver (e.g., the transceiver located outside the car 401) as a first measured value, and also define the RSSI of the position notification signal measured at the second transceiver (e.g., the transceiver located inside the car 401) as a second measured value. For example, if the first measured value is greater than the second measured value, and if a difference between the first and second measured values is greater than a predetermined reference value (e.g., 10 dB), the position determination unit 436 may determine that the external electronic device 440 is located at a first place (e.g., the outside of the car 401) based on the electronic device 400. Alternatively, if the second measured value is greater than the first measured value, and if the difference between the first and second measured values is greater than the reference value (e.g., 10 dB), the position determination unit 436 may determine that the external electronic device 440 is located at a second place (e.g., the inside of the car 401) based on the electronic device 400.

Figure 7:
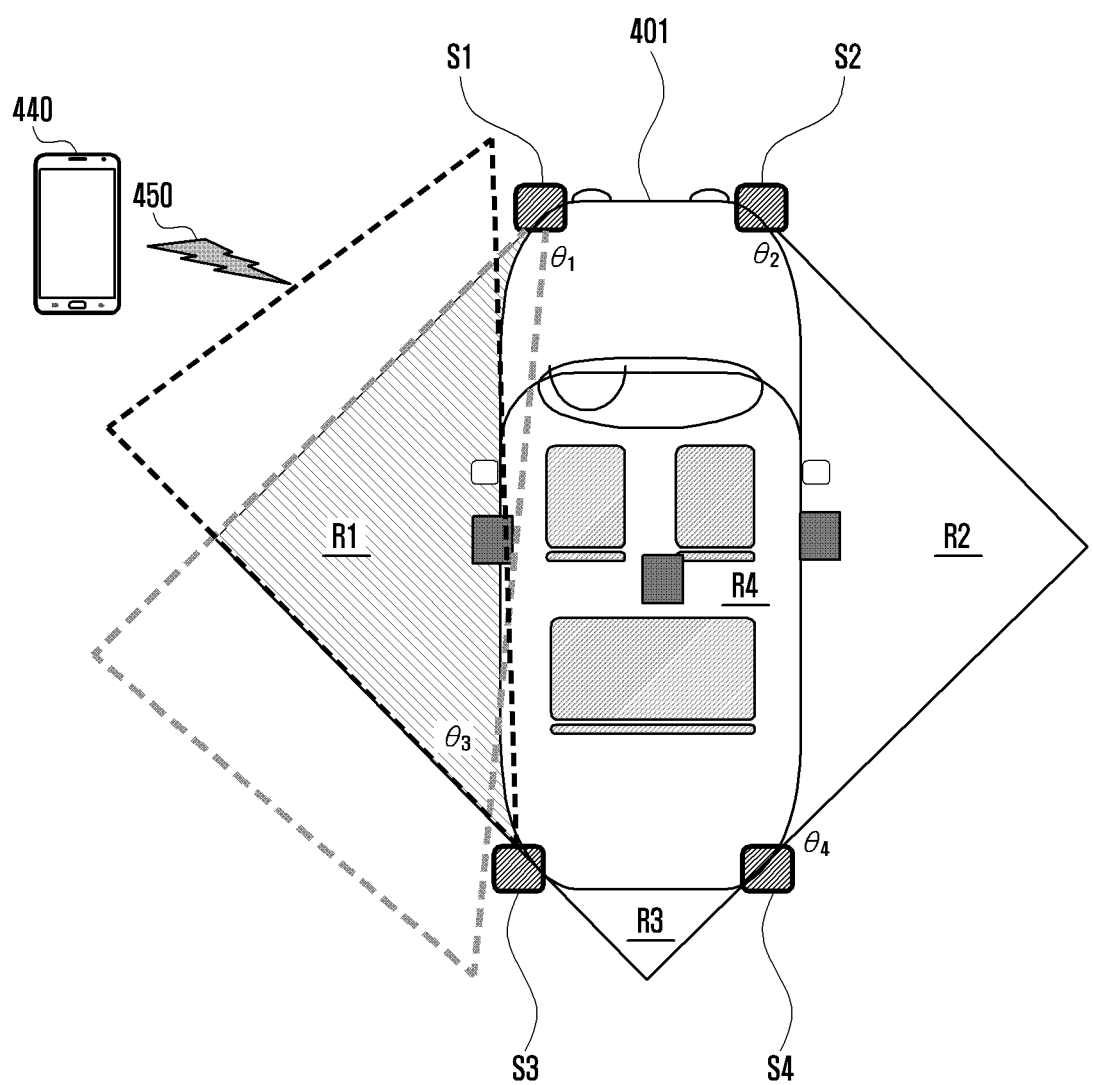
FIG. 7 is a schematic view showing a method for an electronic device to identify the position of an external electronic device according to another embodiment.

FIG. 7 is a schematic view showing a method for an electronic device to identify the position of an external electronic device according to another embodiment.

According to another embodiment of the present invention, the electronic device 400 may measure and analyze the reception angle of the position notification signal of the external electronic device 440 via the transceiver 420, and thereby identify the approximate position of the external electronic device 440. For example, the electronic device 400 may determine a region where the external electronic device 440 is located, rather than determine exact coordinates of the external electronic device 440.

According to an embodiment, as shown in FIG. 7, the position determination unit 436 of the processor 430 may measure the reception angle of the position notification signal via the at least one transceiver 420 and, by referring to the memory 439 that stores a mapping relation between the reception angle of the position notification signal and each of a plurality of regions defined based on the position of the car 401, determine a specific one of the plurality of regions where the external electronic device 440 is located. The processor 430 may define the reception angle of the position notification signal based on each of the plurality of transceivers disposed at different locations. For example, the processor 430 may define the reception angles of the position notification signals measured at four transceivers disposed at different locations as first to fourth angles ($\theta_1$, $\theta_2$, $\theta_3$, and $\theta_4$). As shown in Table 2 below, the memory 439 may store a table that defines relations between four regions and the measured four angles.

For example, the first and second angles ($\theta_1$, $\theta_2$) may be the reception angles of the position notification signals measured via two transceivers S1 and S2 disposed at the front left and right corners of the car 401, and the third and fourth angles ($\theta_3$, $\theta_4$) may be the reception angles of the position notification signals measured via two transceivers S3 and S4 disposed at the rear left and right corners of the car 401.

TABLE 2

| Reception Angle of each transceiver (①: $\theta_1$, ②: $\theta_2$, ③: $\theta_3$, ④: $\theta_4$) | Region |
|---|---|
| 225° < $\theta_1$ < 270° & 90° < $\theta_3$ < 135° | First Region |
| 270° < $\theta_2$ < 315° & 45° < $\theta_4$ < 90° | Second Region |
| 315° < $\theta_3$ < 360° & 180° < $\theta_4$ < 225° | Third Region |
| 270° < $\theta_1$ < 315° & 225° < $\theta_2$ < 270° 45° < $\theta_3$ < 90° & 90° < $\theta_4$ < 135° | Fourth Region |

Figure 8:
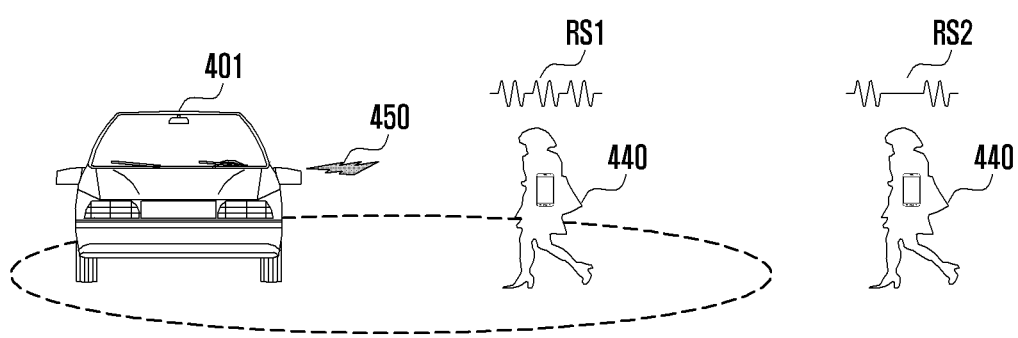
FIG. 8 is an exemplary view showing that an electronic device of the present invention transmits and receives RF signals to and from an external electronic device.

FIG. 8 is an exemplary view showing that an electronic device 400 of the present invention transmits and receives RF signals to and from an external electronic device 440.

Referring to FIG. 8, the position determination unit 436 of the processor 430 may start the positioning operation when the authentication of the external electronic device 440 is completed. For example, the position determination unit 436 may transmit a request signal when the authentication of the external electronic device 440 is completed. The request signal may be a signal of requesting the authenticated external electronic device 440 to transmit a position notification signal to be used for position identification. According to an embodiment, the position determination unit 436 may periodically transmit the request signal and thereby update position information of the identified external electronic device 440.

According to various embodiments, the position determination unit 436 of the processor 430 may vary a period of transmitting the request signal, based on the updated position of the external electronic device 440. For example, the position determination unit 436 may reduce the period of transmitting the request signal as the position of the external electronic device 440 is closer to the car 401. For example, as shown in FIG. 8, when the user who carries the external electronic device 440 is spaced apart from the car 401 by a first distance, the position determination unit 436 may transmit the request signal RS1 at a first period. Similarly, when the user carrying the external electronic device 440 is spaced apart from the car 401 by a second distance, the position determination unit 436 may transmit the request signal RS2 at a second period. The first distance may be smaller than the second distance. The first period may be smaller than the second period. According to various embodiments, by varying the period of transmitting the request signal depending on the position of the external electronic device 440, it is possible to reduce power consumption.

A method for controlling an electronic device according to various embodiments of this disclosure may comprise receiving, via a communication circuit, at least one signal from an external electronic device having a smart key, performing authentication with the external electronic device, based on the at least one signal, measuring at least one of a reception angle of the at least one signal or a received signal strength indication (RSSI) of the at least one signal, based on a result of the performed authentication, identifying a position of the external electronic device, based on at least one of the measured reception angle or the measured RSSI, and controlling at least some components of the electronic device, based on the identified position of the external electronic device.

According to various embodiments of the invention, the communication circuit may include a first transceiver and a second transceiver, and the identifying a position of the external electronic device may include determining a distance between the external electronic device and the electronic device and/or a relative coordinate of the external electronic device, based on reception angles of a plurality of signals measured via the first and second transceivers. The first and second transceivers may be arranged in parallel with each other. The identifying a position of the external electronic device may include analyzing a difference in the RSSI between signals measured at the first and second transceivers, and determining the position of the external electronic device, based on the analyzed result. The identifying a position of the external electronic device may include defining the RSSI of the at least one signal measured at the first transceiver as a first measured value, defining the RSSI of the at least one signal measured at the second transceiver as a second measured value, when the first measured value is greater than the second measured value, and when a difference between the first and second measured values is greater than a predetermined reference value, determining that the external electronic device is located at a first place based on the electronic device, and when the second measured value is greater than the first measured value, and when the difference between the first and second measured values is greater than the reference value, determining that the external electronic device is located at a second place based on the electronic device. The identifying a position of the external electronic device may include determining, among a plurality of regions defined based on the electronic device, a region where the external electronic device is located, based on the reception angle of the signal measured via each of the first and second transceiver. The plurality of defined regions may include an outer region of the electronic device including at least one of a right region, a left region, and a rear region, and an inner region of the electronic device. The method may further comprise periodically transmitting a request signal for requesting transmission of the at least one signal, based on the authentication result, periodically identifying and updating the position of the external electronic device, and varying a transmission period of the request signal, based on the updated position of the external electronic device. The method may further comprise determining, among a plurality of regions defined based on the electronic device, a region where the external electronic device is located, and varying the transmission period of the request signal, based on the determined region. The method may further comprise reducing the transmission period of the request signal as the identified position of the external electronic device is closer to the electronic device.

Figure 9:
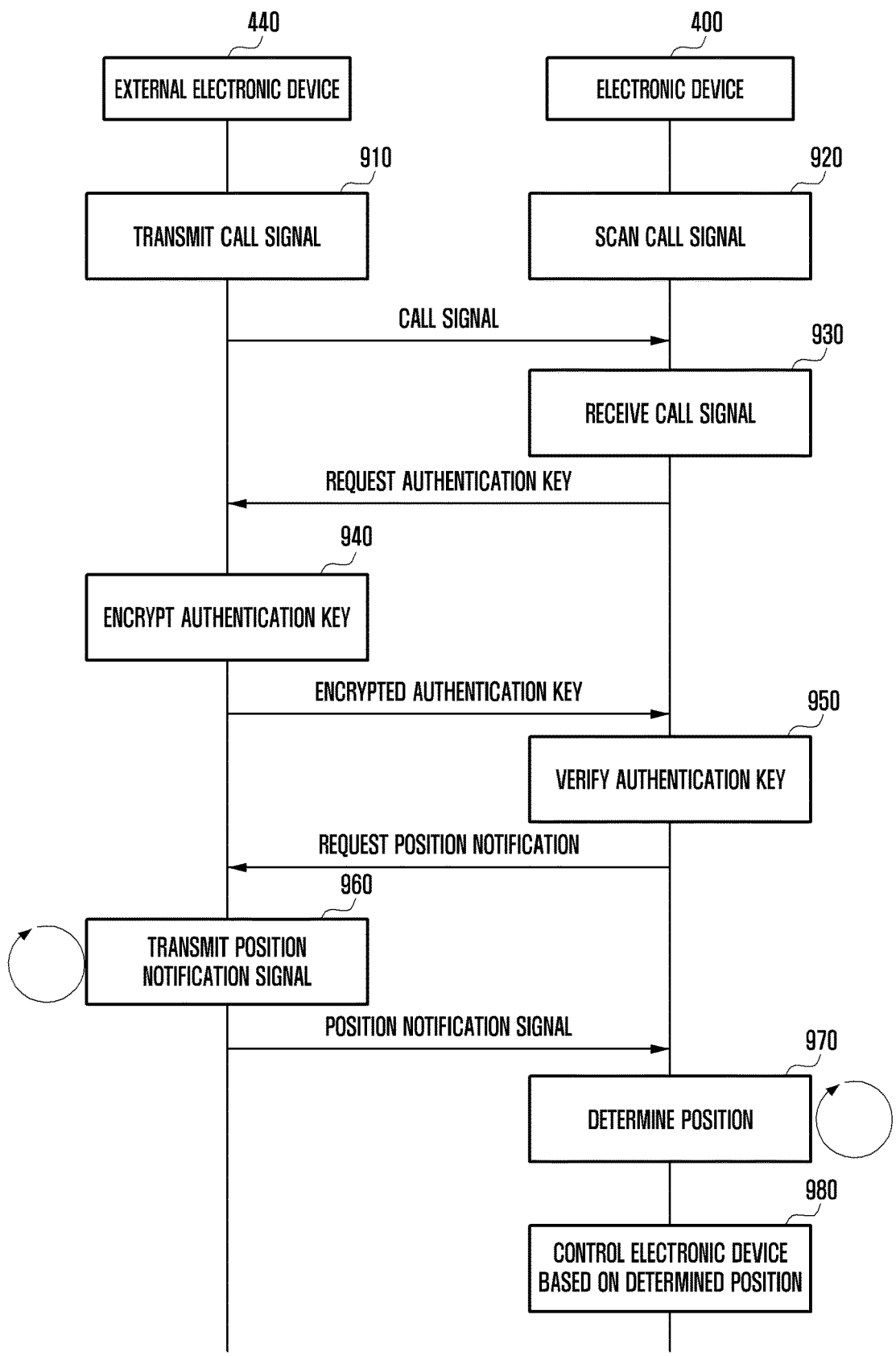
FIG. 9 is a flow diagram illustrating operations of a control system according to an embodiment of the present invention.

FIG. 9 is a flow diagram illustrating operations of a control system according to an embodiment of the present invention.

At operation 910, the external electronic device 440 may transmit a call signal. The call signal may correspond to the smart key 442 installed (registered) in the external electronic device 440 and may be used for finding the registered electronic device 400. According to an embodiment, the external electronic device 440 may periodically transmit the call signal.

At operation 920, the processor 430 of the electronic device 400 may scan the call signal transmitted from the external electronic device 440. For example, the scan unit 432 of the processor 430 may periodically scan the call signal. In addition, when the call signal is received, the scan unit 432 may check whether the received call signal is transmitted from the registered external electronic device 440.

At operation 930, the processor 430 of the electronic device 400 may perform the authentication procedure of the external electronic device 440. For example, the authentication unit 434 of the processor 430 may transmit a signal of requesting the external electronic device 440 to transmit an authentication key.

At operation 940, the external electronic device 440 may transmit the authentication key in response to the signal requesting the transmission of the authentication key. For example, the external electronic device 440 may encrypt the authentication key and transmit the encrypted authentication key to the electronic device 400.

At operation 950, the processor 430 of the electronic device 400 may verify the authentication key transmitted from the external electronic device 440. For example, the authentication unit 434 of the processor 430 may analyze the encrypted authentication key and, when the authentication key is registered in the electronic device 400, transmit an authentication completion message. According to an embodiment, the authentication unit 434 may transmit a request signal when the authentication of the external electronic device 440 is completed. For example, the request signal may be a signal of requesting the authenticated external electronic device 440 to transmit a position notification signal to be used for position identification.

At operation 960, the external electronic device 440 may transmit the position notification signal in response to the request signal transmitted from the electronic device 400. For example, the external electronic device 440 may periodically transmit the position notification signal.

At operation 970, the processor 430 of the electronic device 400 may identify the position of the external electronic device 440, based on the position notification signal transmitted from the external electronic device 440. For example, the position determination unit 436 of the processor 430 may measure, as a first variable, an angle at which the position notification signal is received through at least one transceiver 420. In addition, the position determination unit 436 may measure, as a second variable, a received signal strength indication (RSSI) of the position notification signal through the at least one transceiver 420. Then, the position determination unit 436 may identify the position of the external electronic device 440 by analyzing the measured first or second variable. According to a certain embodiment, by analyzing the first variable or the second variable, the position determination unit 436 may identify a region where the external electronic device 440 is located, identify a distance between the external electronic device 440 and the electronic device 400, or identify whether the external electronic device 440 is located inside the electronic device 400.

At operation 980, the processor 430 of the electronic device 400 may provide various services based on the identified position of the external electronic device 440. The various services may include an intelligent function provided by the electronic device 400 on the basis of interaction with the external electronic device 440. For example, the control unit 438 of the processor 430 may perform operations as shown in Table 1, based on the identified position of the external electronic device 440.

According to another embodiment of the present invention, the calling and authentication procedure between the electronic device 400 and the external electronic device 440 may be performed by the electronic device 400. For example, at operation 910, the electronic device 400 may transmit the call signal. The call signal may be used for finding the registered external electronic device 440. According to an embodiment, the electronic device 400 may periodically transmit the call signal.

At operation 920, the external electronic device 440 may scan the call signal transmitted from the electronic device 400.

At operation 930, the external electronic device 440 may perform the authentication procedure. For example, when the call signal is received, the external electronic device 440 may determine whether the received call signal is transmitted from the registered electronic device 400. When it is determined that the call signal is transmitted from the registered electronic device 400, the external electronic device 440 may transmit a signal of requesting the authentication key.

At operation 940, the electronic device 400 may receive the signal of requesting the authentication key from the external electronic device 440. For example, when the signal of requesting the authentication key is received, the electronic device 400 may encrypt the authentication key and transmit the encrypted authentication key.

At operation 950, the external electronic device 440 may receive the authentication key from the electronic device 400. When the authentication key is received, the external electronic device 440 may analyze the authentication key and thereby determine whether the authentication key is registered. When it is determined that the authentication key is registered, the external electronic device 440 may transmit an authentication completion signal to the electronic device 400. Upon receiving the authentication completion signal, the electronic device 400 may transmit a signal of requesting the position notification signal to identify the position of the external electronic device 440.

Figure 10:
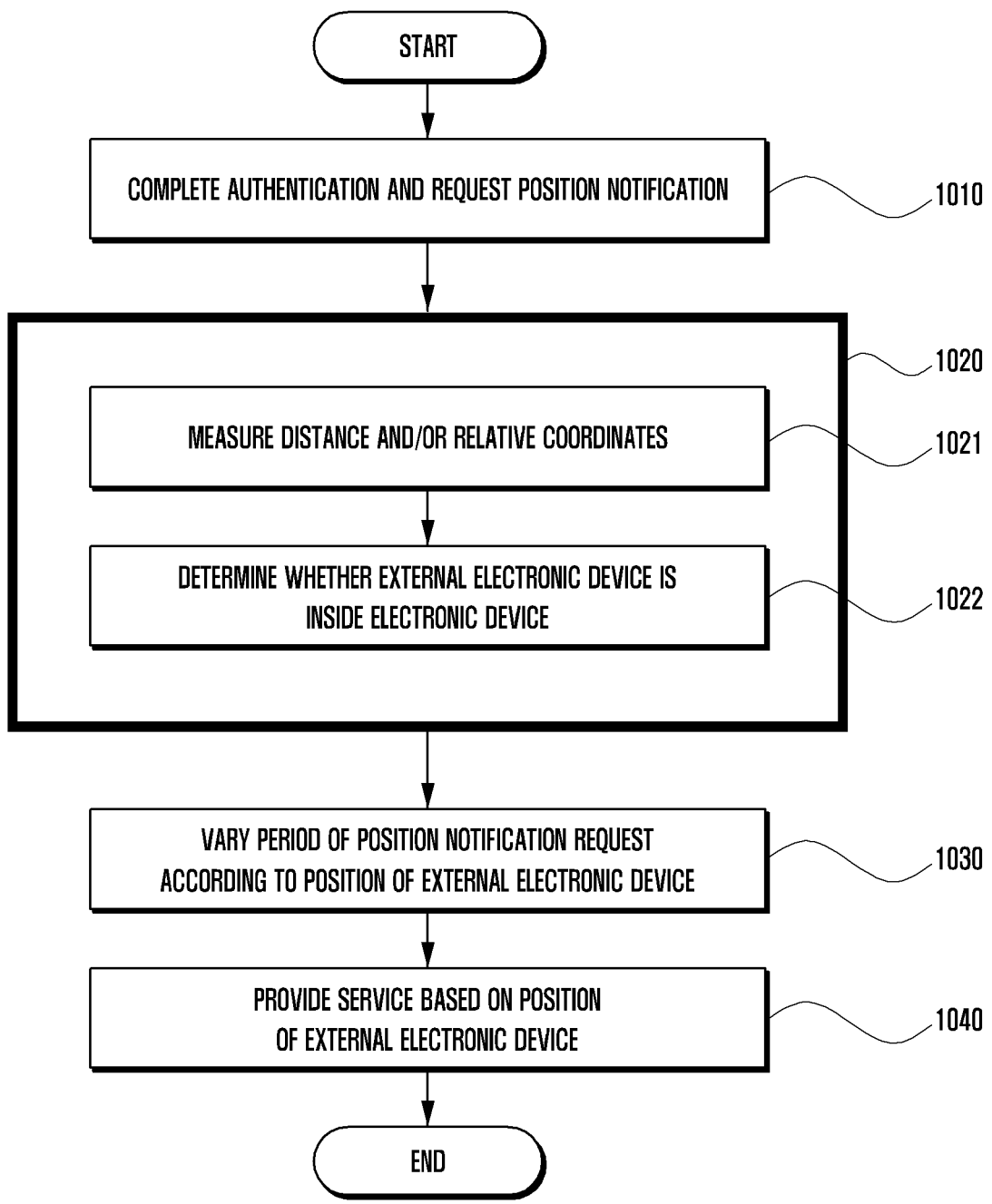
FIG. 10 is a flow diagram illustrating a method for identifying the position of an external electronic device at an electronic device according to an embodiment.

FIG. 10 is a flow diagram illustrating a method for identifying the position of an external electronic device 440 at an electronic device 400 according to an embodiment.

At operation 1010, the processor 430 of the electronic device 400 may transmit a request signal when the authentication with the external electronic device 440 is completed. For example, the request signal may be a signal of requesting the authenticated external electronic device 440 to transmit a position notification signal to be used for position identification.

At operation 1020, the processor 430 of the electronic device 400 may identify the position of the external electronic device 440, based on the position notification signal transmitted from the external electronic device 440.

According to various embodiments of the present invention, a method for the electronic device 400 to identify the position of the external electronic device 440 may use at least one of the reception angle or RSSI of the position notification signal measured via at least one transceiver. For example, the above method may include (i) a method for determining the position of the external electronic device 440 by analyzing the reception angle of the position notification signal measured via the at least one transceiver, (ii) a method for determining the position of the external electronic device 440 by analyzing the RSSI of the position notification signal measured via the at least one transceiver, and (iii) a method for determining the position of the external electronic device 440 by analyzing both the reception angle and the RSSI.

For example, at operation 1021, the processor 430 may analyze the reception angle of the position notification signal via a plurality of transceivers and thereby calculate a distance between the electronic device 400 and the external electronic device 440 or the coordinates of the external electronic device 440. According to an embodiment, a method for the processor 430 to measure the distance and/or relative coordinates of the external electronic device 440 by analyzing the reception angle may use Equation 1 described above.

For example, at operation 1022, the position determination unit 436 of the processor 430 may analyze a difference in the RSSI between the position notification signals measured at the plurality of transceivers and thereby determine the position of the external electronic device 440. For example, it is possible to determine whether the external electronic device 440 is located inside the car 401.

For example, the position determination unit 436 may define the RSSI of the position notification signal measured at one of the plurality of transceivers as a first measured value, and also define the RSSI of the position notification signal measured at another transceiver as a second measured value. For example, if the first measured value is greater than the second measured value, and if a difference between the first and second measured values is greater than a predetermined reference value, the position determination unit 436 may determine that the external electronic device 440 is located at a first place (e.g., the outside of the car). Alternatively, if the second measured value is greater than the first measured value, and if the difference between the first and second measured values is greater than the reference value, the position determination unit 436 may determine that the external electronic device 440 is located at a second place (e.g., the inside of the car).

In various embodiments of the present invention, one of the above-described operations 1021 and 1022 may be omitted. For example, the electronic device 400 may determine the distance between the external electronic device 440 and the electronic device 400 and the position of the external electronic device 440 by analyzing the reception angle of the position notification signal via the plurality of transceivers at operation 1021 without performing operation 1022. Alternatively, the electronic device 400 may determine the position of the external electronic device 440 by comparing the RSSIs of the position notification signals respectively measured at the external and internal transceivers, thus skipping operation 1021.

According to an embodiment, the plurality of transceivers may be disposed outside or inside the electronic device 400.

At operation 1030, the processor 430 of the electronic device 400 may periodically transmit a request signal and thereby update the identified position information of the external electronic device 440. For example, the position determination unit 436, or the control unit 438 of the processor 430, may vary a period of transmitting the request signal, based on the updated position of the external electronic device 440. For example, the position determination unit 436 may reduce the period of transmitting the request signal as the position of the external electronic device 440 is closer to the electronic device 401.

At operation 1040, the processor 430 of the electronic device 400 may provide various services based on the identified position of the external electronic device 440. The various services may include an intelligent function provided by the electronic device 400 on the basis of interaction with the external electronic device 440. For example, the control unit 438 of the processor 430 may perform operations as shown in Table 1, based on the identified position of the external electronic device 440.

Figure 11:
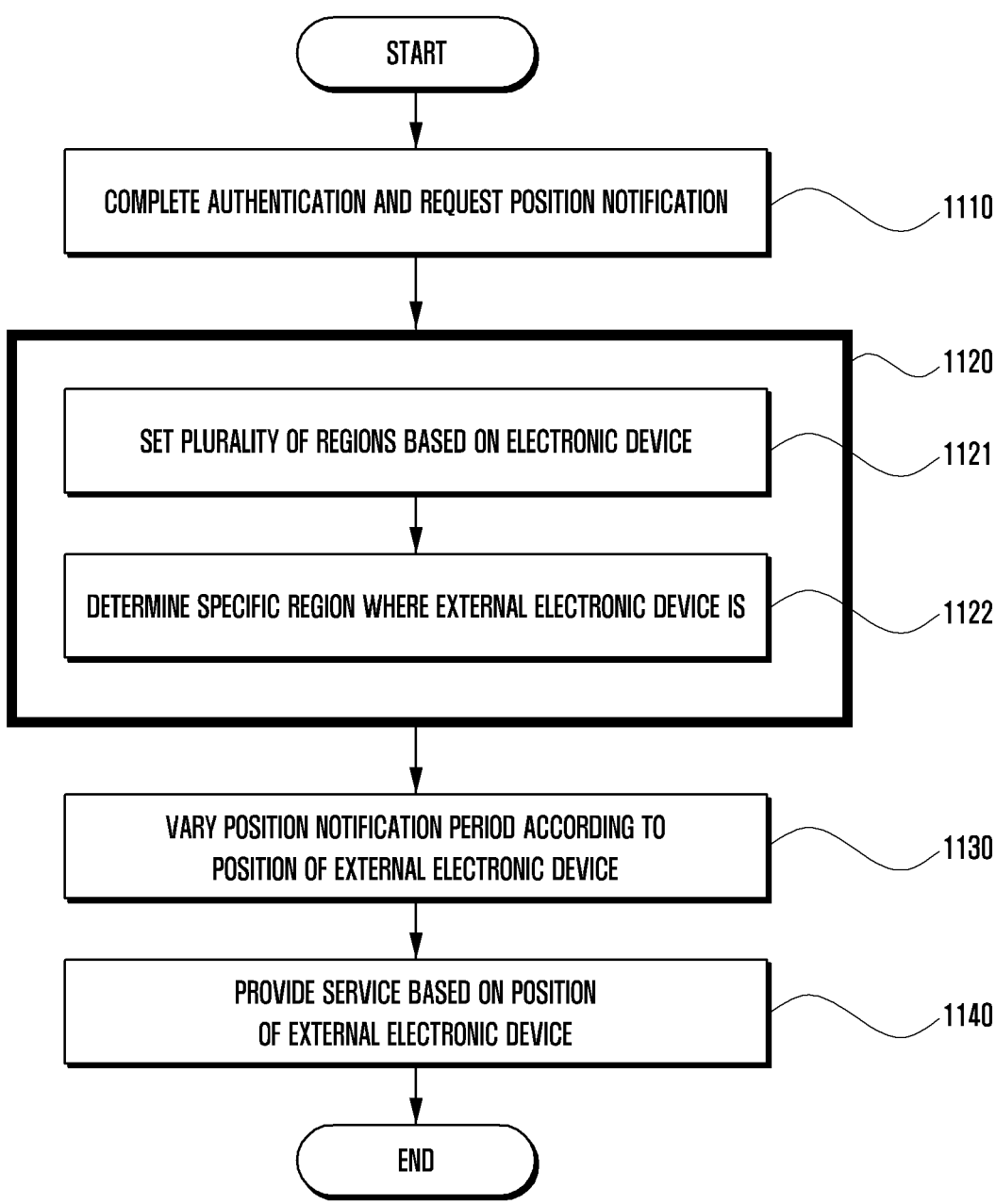
FIG. 11 is a flow diagram illustrating a method for identifying the position of an external electronic device at an electronic device according to another embodiment.

FIG. 11 is a flow diagram illustrating a method for identifying the position of an external electronic device 440 at an electronic device 400 according to another embodiment.

Referring to FIG. 11, the processor 430 of the electronic device 400 may measure and analyze an angle at which the position notification signal of the external electronic device 440 is received, and thereby identify an approximate position of the external electronic device 440. For example, the processor 430 of the electronic device 400 may determine a region where the external electronic device 440 is located.

At operation 1110, the processor 430 of the electronic device 400 may transmit a request signal when the authentication with the external electronic device 440 is completed. For example, the request signal may be a signal of requesting the authenticated external electronic device 440 to transmit a position notification signal to be used for position identification.

At operation 1020, the processor 430 of the electronic device 400 may identify the position of the external electronic device 440, based on the position notification signal transmitted from the external electronic device 440. For example, the processor 430 of the electronic device 400 may determine a region where the external electronic device 440 is located.

For example, at operation 1121, the processor 430 of the electronic device 400 may set a plurality of regions based on the electronic device 400 by referring to the memory 439 that stores a mapping relation between the reception angle of the position notification signal and each region defined based on the electronic device 400.

For example, at operation 1122, the position determination unit 436 of the processor 430 of the electronic device 400 may measure the reception angle of the position notification signal through the at least one transceiver 420. The position determination unit 436 may analyze the measured angle by referring to the memory 439 and determine, among the plurality of region set in the memory 439, a specific region where the external electronic device 440 is located. For example, the position of the external electronic device 440 identified by the position determination unit 436 may be one of the first to fourth regions as shown in FIG. 7. Also, the reception angle of the position notification signal and the plurality of regions defined based on the electronic device 400 may be the same as or similar to those shown in Table 2 above.

At operation 1130, the processor 430 of the electronic device 400 may periodically transmit a request signal and thereby update the identified position information of the external electronic device 440. For example, the position determination unit 436, or the control unit 438 of the processor 430, may vary a period of transmitting the request signal, based on the updated position of the external electronic device 440. For example, the position determination unit 436 may reduce the period of transmitting the request signal as the position of the external electronic device 440 is closer to the electronic device 401.

At operation 1140, the processor 430 of the electronic device 400 may provide various services based on the identified position of the external electronic device 440. The various services may include an intelligent function provided by the electronic device 400 on the basis of interaction with the external electronic device 440. For example, the control unit 438 of the processor 430 may perform operations as shown in Table 1, based on the identified position of the external electronic device 440.

According to various embodiments of the present invention, the smart key 442 is installed in the external electronic device 440 in order to control the electronic device 400, thus improving the accuracy of identifying the position of the external electronic device 440 and providing improved user convenience.

Each of elements described in this disclosure may include one or more components, and the name of such an element may change depending on the type of electronic device. In various embodiments, the electronic device may be composed to include at least one of the above-described elements. Some of the above-described elements may be omitted from the electronic device, or the electronic device may further include additional elements. Also, some elements of the electronic device according to various embodiments may be combined into one entity, which may perform functions identical to those of the relevant elements before the combination.

While this disclosure contains many specific implementation details, these should not be construed as limitations on the scope of the invention or of what may be claimed, but rather as descriptions of features that may be specific to particular embodiments of particular invention.

What is claimed is:

1. An electronic device comprising:
a communication circuit; and
a processor electrically connected to the communication circuit,
wherein the processor is configured to:
receive, via the communication circuit, at least one signal from an external electronic device having a smart key,
perform authentication with the external electronic device, based on the at least one signal,
measure at least one of a reception angle of the at least one signal or a received signal strength indication (RSSI) of the at least one signal, based on a result of the performed authentication,
identify a position of the external electronic device, based on at least one of the measured reception angle or the measured RSSI, and
control at least some components of the electronic device, based on the identified position of the external electronic device,
wherein the processor is further configured to:
periodically transmit a request signal for requesting transmission of the at least one signal, based on the authentication result,
periodically identify and update the position of the external electronic device, and
vary a transmission period of the request signal, based on the updated position of the external electronic device.

2. The electronic device of claim 1, wherein the communication circuit includes a first transceiver and a second transceiver, and
wherein the processor is further configured to determine a distance between the external electronic device and the electronic device and/or a relative coordinate of the external electronic device, based on reception angles of a plurality of signals measured via the first and second transceivers.

3. The electronic device of claim 2, wherein the first and second transceivers are arranged in parallel with each other.

4. The electronic device of claim 2, wherein the processor is further configured to:
analyze a difference in the RSSI between signals measured at the first and second transceivers, and
determine the position of the external electronic device, based on the analyzed result.

5. The electronic device of claim 4, wherein the processor is further configured to:
define the RSSI of the at least one signal measured at the first transceiver as a first measured value,
define the RSSI of the at least one signal measured at the second transceiver as a second measured value,
when the first measured value is greater than the second measured value, and when a difference between the first and second measured values is greater than a predetermined reference value, determine that the external electronic device is located at a first place relative to the electronic device, and
when the second measured value is greater than the first measured value, and when the difference between the first and second measured values is greater than the reference value, determine that the external electronic device is located at a second place relative to the electronic device.

6. The electronic device of claim 2, wherein the processor is further configured to:
determine, among a plurality of regions defined based on the electronic device, a region where the external electronic device is located, based on the reception angles of the signals measured via each of the first and second transceivers.

7. The electronic device of claim 6, wherein the plurality of defined regions includes:
an outer region of the electronic device including at least one of a right region, a left region, or a rear region, and
an inner region of the electronic device.

8. The electronic device of claim 1, wherein the processor is further configured to:
determine, among a plurality of regions defined based on the electronic device, a region where the external electronic device is located, and
vary the transmission period of the request signal, based on the determined region.

9. The electronic device of claim 1, wherein the processor is further configured to:
reduce the transmission period of the request signal as the identified position of the external electronic device becomes closer to the electronic device.

10. A method for controlling an electronic device, comprising:
receiving, via a communication circuit of the electronic device, at least one signal from an external electronic device having a smart key,
performing, by the electronic device, authentication with the external electronic device, based on the at least one signal,
measuring, by the electronic device, at least one of a reception angle of the at least one signal or a received signal strength indication (RSSI) of the at least one signal, based on a result of the performed authentication,
identifying, by the electronic device, a position of the external electronic device, based on at least one of the measured reception angle or the measured RSSI, and
controlling, by the electronic device, at least some components of the electronic device, based on the identified position of the external electronic device,
wherein the method further comprises:
periodically transmitting a request signal for requesting transmission of the at least one signal, based on the authentication result,
periodically identifying and updating the position of the external electronic device, and
varying a transmission period of the request signal, based on the updated position of the external electronic device.

11. The method of claim 10, wherein the communication circuit includes a first transceiver and a second transceiver, and
wherein the identifying of a position of the external electronic device includes determining a distance between the external electronic device and the electronic device and/or a relative coordinate of the external electronic device, based on reception angles of a plurality of signals measured via the first and second transceivers.

12. The method of claim 11, wherein the identifying of a position of the external electronic device includes:
analyzing a difference in the RSSI between signals measured at the first and second transceivers, and
determining the position of the external electronic device, based on the analyzed result.

13. The method of claim 10, further comprising:
determining, among a plurality of regions defined based on the electronic device, a region where the external electronic device is located, and
varying the transmission period of the request signal, based on the determined region.

* * * * *